Figure 1:
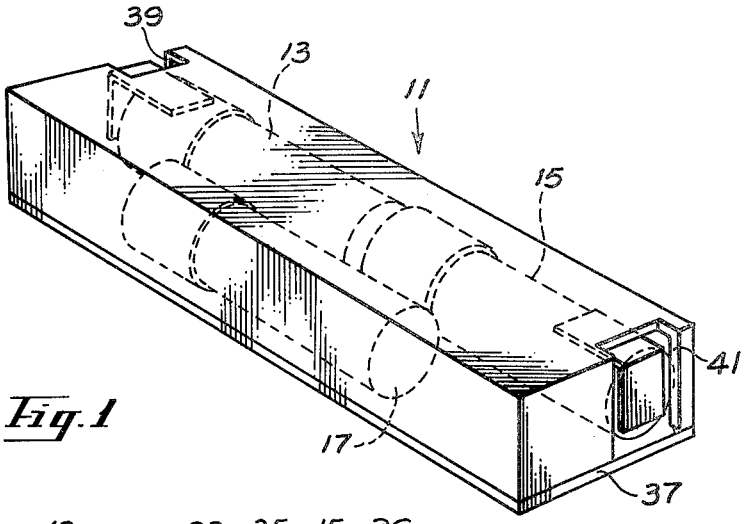
Figure 2:
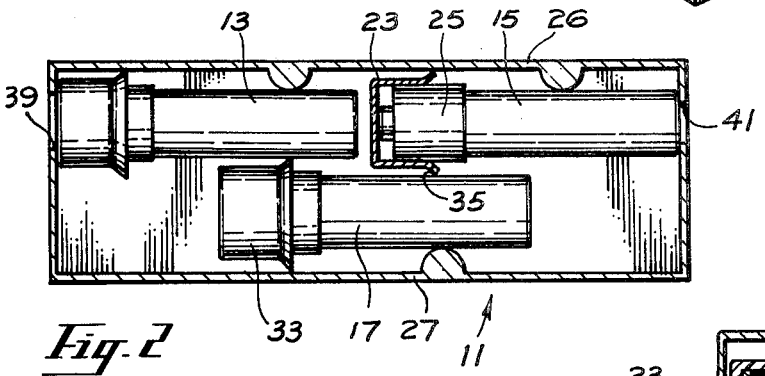
Figure 3:
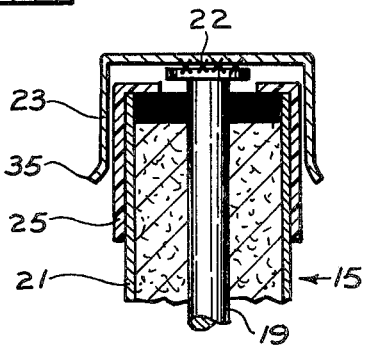
Figure 4:
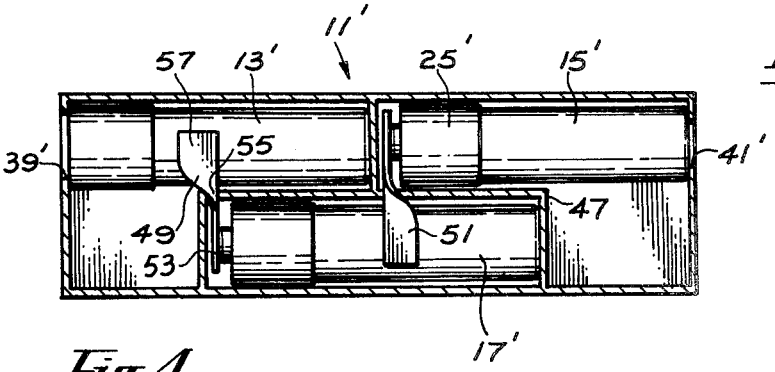

United States Defensive Publication [19] (H) [11] T994,002

Harvey et al. [43] May 6, 1980

[54] BATTERY PACKAGE AND ASSEMBLY

[76] Inventors: Frederick W. Harvey; Norman E. Hess; Gurdip S. Sethi, all of 1669 Lake Ave., Rochester, N.Y. 14650

[21] Appl. No.: 47,397

[22] Filed: Jun. 11, 1979

[51] Int. Cl.[2] ..... H01M 2/24

[52] U.S. Cl. ..... 429/158

[57] ABSTRACT

Three cylindrical battery cells are physically disposed in a plastic housing with two of the cells spaced coaxially adjacent one another and the third cell spaced laterally adjacent the coaxial cells spanning the distance between the coaxial cells. An insulating band encircles the end of each cell, between the end cap and a current-collecting sleeve, to prevent shorting between the current collectors. The three cells are connected electrically by conductive elements, such as end caps or straps, that place the third cell in series between the coaxial cells.

3 Claims, 1 Sheet Drawing,

8 Pages Specification

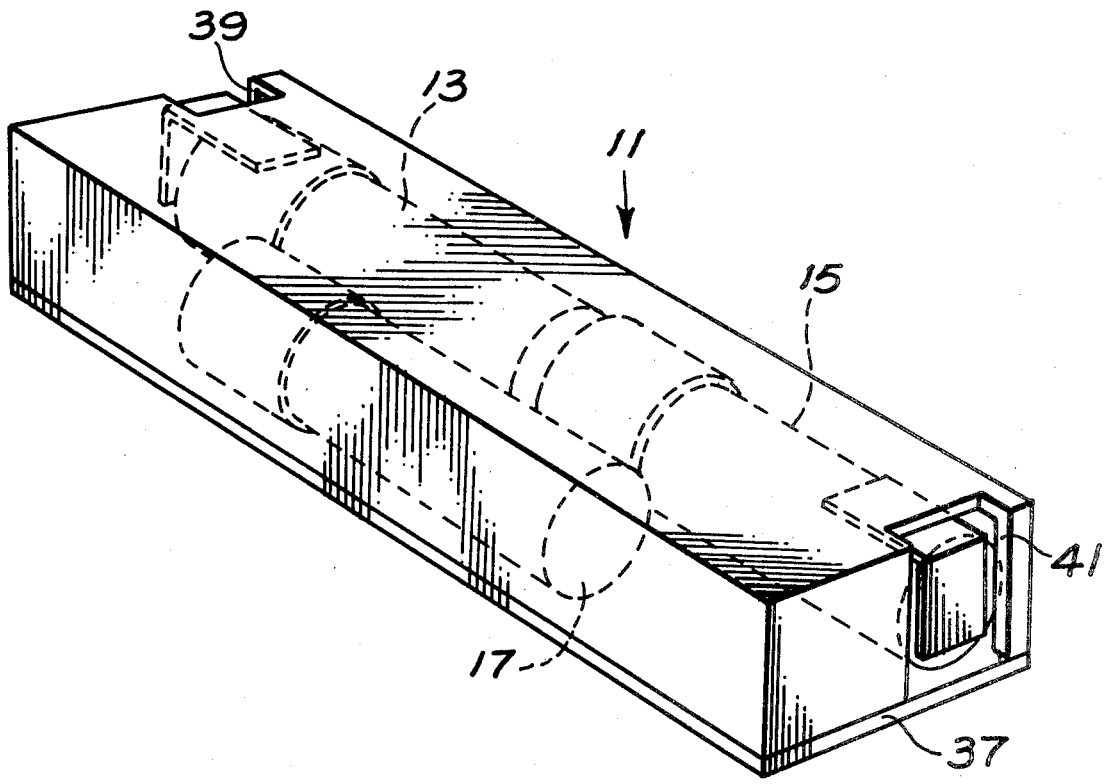

The file of this unexamined application may be inspected and copies thereof may be purchased (849 O.G. 1221, Apr. 9, 1968).